United States Patent
Seidel et al.

(10) Patent No.: US 10,532,524 B2
(45) Date of Patent: Jan. 14, 2020

(54) METHOD OF REPAIRING DAMAGE OF AIRCRAFT ENGINE COMPONENTS MADE OF WELDABLE THERMOPLASTIC MATERIALS

(71) Applicant: MTU Aero Engines AG, Munich (DE)

(72) Inventors: Frank Seidel, Grossburgwedel (DE); Leszek Zak, Zaczernie (PL); Nils Weidlich, Neustadt (DE)

(73) Assignee: MTU AERO ENGINES AG, Munich (DE)

( * ) Notice: Subject to any disclaimer, the term of this patent is extended or adjusted under 35 U.S.C. 154(b) by 346 days.

(21) Appl. No.: 15/371,330

(22) Filed: Dec. 7, 2016

(65) Prior Publication Data

US 2017/0165928 A1 Jun. 15, 2017

(30) Foreign Application Priority Data

Dec. 11, 2015 (EP) .................................. 15199446

(51) Int. Cl.
*B29C 73/02* (2006.01)
*B29B 11/10* (2006.01)
*B29C 35/04* (2006.01)
*B29K 77/00* (2006.01)
*B29L 31/30* (2006.01)

(52) U.S. Cl.
CPC ............ *B29C 73/025* (2013.01); *B29B 11/10* (2013.01); *B29C 35/045* (2013.01); *B29C 2035/046* (2013.01); *B29K 2077/00* (2013.01); *B29L 2031/3076* (2013.01)

(58) Field of Classification Search
CPC ....... B29C 73/00; B29C 73/02; B29C 73/025; B29C 73/06; B29C 73/063; B29C 73/066; B29C 73/10; B29C 73/105; B29C 73/22; B29C 73/245; B29C 2073/266; B29C 33/74; B29C 35/045; B29C 73/30; B29C 73/34; B29B 11/10
See application file for complete search history.

(56) References Cited

U.S. PATENT DOCUMENTS 5,961,054 A * 10/1999 Nishibori ................ B29B 13/10
241/19
7,281,647 B2 10/2007 Stol et al.
8,563,079 B2 10/2013 Sullivan et al.
(Continued)

FOREIGN PATENT DOCUMENTS

EA 201100480 A 3/2012
EP 0225943 A1 6/1987
(Continued)

OTHER PUBLICATIONS

Die Wegener Schweissfibel, "Tipps und Tricks zum Schweissen von Thermoplasten" (Tips and tricks for the welding of thermopasts), 17 pages, cited in application.

*Primary Examiner* — Stella K Yi
(74) *Attorney, Agent, or Firm* — Abel Schillinger, LLP

(57) ABSTRACT

Disclosed is a method of repairing damage of an aircraft engine component made of or comprising weldable thermoplastic material, which method comprises welding of the weld filler material into an initially prepared damaged area. Also disclosed are the use of plastic welding technique for repairing damaged aircraft engine components made of weldable thermoplastic materials.

14 Claims, 2 Drawing Sheets

(56) References Cited

U.S. PATENT DOCUMENTS

2005/0279810 A1    12/2005   Stol et al.
2010/0310873 A1    12/2010   Sullivan et al.
2015/0001768 A1    1/2015   Kia et al.

FOREIGN PATENT DOCUMENTS

EP    2261012 A1    12/2010
JP    2009286895    *   5/2008
WO    2006009778 A1    1/2006

* cited by examiner

METHOD OF REPAIRING DAMAGE OF AIRCRAFT ENGINE COMPONENTS MADE OF WELDABLE THERMOPLASTIC MATERIALS

CROSS-REFERENCE TO RELATED APPLICATIONS

The present application claims priority under 35 U.S.C. § 119 of European Patent Application No. 15199446.4, filed Dec. 11, 2015, the entire disclosure of which is expressly incorporated by reference herein.

BACKGROUND OF THE INVENTION

1. Field of the Invention

The present invention relates to a method of repairing damage of aircraft engine components made of weldable thermoplastic materials, wherein the damaged area, in particular cracks are welded using melted filler material which is the same weldable thermoplastic material as the material of the damaged component. The method is useful in particular in the area of maintenance services in aeronautics for extending the service time of thermoplastic components of aircraft engines while maintaining required mechanical strength parameters.

2. Discussion of Background Information

From the beginning in aircraft construction use of lightweight materials has been a priority, aiming to improve thrust-to-weight ratio. Besides metallic materials including high strength steel and alloys of metals of density lower than steel, such as aluminum and magnesium, the group of widely used materials are polymers and polymeric composites. As in many other areas of construction, initial use of polymers and composites thereof involved mostly thermosetting polymers, but since several years there is a clear and growing tendency to use thermoplastic polymers wherever possible. The thermoplastic polymers and some thermoplastic-elastomer composites are meltable and heat formable, allowing to obtain a wide variety of complex shapes by application of heat and pressure.

Among other components aircraft engines include elements made of plastics, such as in particular shielding panels made of thermoplastic material surrounding a jet engine fan. To assure reliable assembly to metallic body of the fan or other parts of the engine, most of these plastic components are provided with metallic bushings, typically made of aluminum alloys, embedded in the plastic material and designed to receive screws, bolts or other connecting means.

Some aircraft engine plastic components undergo high stress during engine operation. Factors to be taken into account include operation in broad temperature ranges, and varying dynamic stresses, such as between operation of a jet engine in a normal mode and in a thrust reverser mode. This may eventually lead to extensive cracking, often occurring close to the plastic body-metallic bushing interface or close to external edges of the elements. Such damages components have to be either replaced by new parts, which is expensive, or to be repaired. Due to safety reasons, which are extremely important in aeronautics (defined in numerous regulations and controlled by administrative bodies such as Federal Aviation Administration or European Aviation Safety Agency), the repaired parts have to meet strict technical standards, including in particular sufficient mechanical strength. Therefore, repairs of plastic parts of aircraft engines are generally practiced to much smaller extent than in any other field of technology and only with respect to relatively small cracks or damages.

Typically aircraft engine components made of plastics are repaired using composite tape or glue technique. This technique is generally capable to heal small cracks damages, but cannot be effectively used for heavy damages and intensive cracking. Therefore heavily damaged parts must be removed and replaced by expensive new parts. Furthermore, even slightly damaged parts, which have been repaired by glue technique do not show sufficient durability in further service operation, and therefore the applicability of this technique is limited to minor elements not exposed to high stress during operation.

On the other hand, welding of thermoplastic materials has been known for decades in various areas, mostly for joining together plastic elements to produce more complex shapes, e.g. difficult to obtain by injection moulding or joining together two different polymeric materials. Numerous plastic welding techniques are known, such as hot air welding (including in particular using welding rod, but also heat sealing or freehand welding), speed tip welding, extrusion welding, contact welding, hot plate welding, high frequency welding, induction welding, injection welding, ultrasonic welding, friction welding, spin welding, laser welding and solvent welding. The choice of specific technique is dependent on the actual task, that is the type of thermoplastic material(s), specific form of the parts to be joined, environment conditions and requirements (e.g. presence of flammable gases, limited access to the welding area), desired properties of the welded structure, presence of other materials (e.g. metallic elements, which might heat up too much during the process and negatively affect the final outcome), overall costs of the process, timing, availability of the respectively trained operators and required equipment, etc. Exemplary publications from this field discussing in detail various aspects of the welding of plastics such as PP (polypropylene), PE (polyethylene), PVC (polyvinylchloride), CPVC (chlorinated PVC), PVDF (polyvinylidene fluoride) and ABS (terpolymer: acrylonitrile-butadiene-styrene) include brochures entitled "Guidelines for welding thermoplastic materials" available at www.wegenerwelding.com/pdf/09_Guidelines.pdf and "Tipps un Tricks zum Schweissen von Thermoplasten" available at www.wegenerwelding.de/PDFs/schweissfibel.pdf.

In addition to manufacturing new parts of thermoplastic materials, welding techniques have been also known in various applications related to repair of damages plastic parts. For example, in WO 2006/009778 (A1), the entire disclosure of which is incorporated by reference herein, a method of repairing a discrepancy in a thermoplastic workpiece is disclosed, said method including excising the discrepancy by cutting, milling, or otherwise removing workpiece material surrounding the discrepancy so as to remove the discrepancy and form a cylindrical hole in the workpiece. The method further includes placing a cylindrical plug in the cylindrical hole and moving a friction stir welding tool around the circumference of the plug to weld the plug to the workpiece.

Further, in EA 201100480 (A1), the entire disclosure of which is incorporated by reference herein, a method of restoring articles from thermoplastic polymer material by a method of extrusion welding is disclosed. The method involves the steps of cleaning and mechanical surface preparation of an article to be restored, activation of the article surface by hot air heating with parallel heating of a thermoplastic polymer material to be welded, extruding of the welded material on an activated restoring surface through an extruder nozzle, cooling the article and subsequent mechanical surface treatment to the required parameters. This method requires that both the main and the welded material must have almost the same chemical composition and indices of melt plasticity.

US 2015/0001768 (A1), the entire disclosure of which is incorporated by reference herein, discloses a method of repairing damage in a thermoplastic component, wherein the damaged component is positioned between opposing corresponding die portions provided with a magnetic system for bringing the portions together in an arrangement corresponding to the shape of the undamaged component, selectively heating the component at the damage zone for a time sufficient to heal the damage by the die portions reshaping the component to its original, undamaged form.

However, in the field of maintenance of plastic parts of aircraft engines the repairs were limited only to small damages such as small cracks and were realized exclusively by glue technique. More seriously damaged plastic parts have been generally replaced by new ones, as there was no reliable method for maintaining the required parameters (in particular mechanical strength and stress resistance) in case of repairs of more extensive cracking. No publication known to the inventors disclosed attempts to test any other repair method of such thermoplastic parts and/or to measure the durability of such repaired elements. Therefore, there was a clear technical prejudice in the prior art, discouraging engineers from considering repair of more serious damaged areas of plastic parts of aircraft engines, in particular due to safety requirements which are much stricter than in other fields of application of such materials.

SUMMARY OF THE INVENTION

It has now been found that repairing aircraft engine components made of thermoplastic materials using welding techniques instead of the glue technique, significantly improves the quality and reliability of the repaired components. More specifically, the welded joints have been found to reveal much better material properties than glued cracks/other damages, especially in terms of stress resistance and thermal and mechanical fatigue. Therefore, the method according to the invention results in higher durability of the repaired parts compared to conventionally repaired parts and allows to considerably extend their overall lifetime in service, while maintaining the required level of security. Further, it was found that unlike the glue technique, welding allows to effectively repair components of considerable higher damage level, such as much more extensive cracking, which results in significant increase of the repair rate.

Accordingly, the present invention provides a method of repairing a damaged area of an aircraft engine component made of weldable thermoplastic material(s) or thermoplastic-elastomer composite(s). The method comprises:

cleaning a damaged area of the component by mechanical and/or chemical process;
inspecting the cleaned damaged area to determine the repair scope;
preparing the damaged area for welding preferably by notching the crack or other type of damage to a predetermined shape of a notch;
providing weld filler material, preferably in the form of a welding rod to a close proximity of one end of the notch;
heat treating the contact area of weld filler material and the notch and at the same time applying pressure to the weld filler material so as to introduce the softened weld filler material into the notch and fuse the weld filler material with the thermoplastic material of the notch walls;
allowing the weld to cool down;
restoring the geometry of the original part by removal of excessive weld material and polishing.

In the above method any heat source may be used to perform a heat treatment to the repaired part in order to improve the properties of the repaired part. Consequently, heat up for welding can be realized with several tools such as hot air gun, ultrasounds or friction stir welding.

However, in a preferred aspect of the above method the welding may be realized using a hot air nozzle as a heat source. Such technique has proven to be the most effective, relatively easy to manage and applicable to repair different types of damage.

According to another aspect of the above method, the weld filler material may be the same as the thermoplastic material of the damaged component. This is particularly expedient in order to provide the repaired components with the properties similar to the original new components, especially in terms of overall mechanical strength and stress resistance.

In another aspect of the above method, the weld filler material may be obtained from the original aircraft engine components of weldable thermoplastic material(s) by controlled crushing of the initially prepared components (preferably prepared by removal of metallic elements such as bushings and cleaned) to a granulate of predetermined granule size, melting the granulate and extruding the weld filler material to form regularly shaped rods to be used in the repair method. The use of original parts as a source of high quality weld filler material not only significantly reduces the overall costs associated with providing weld filler material from other sources, but also greatly contributes to stability of the parameters of the repaired components, as any problems associated with possible composition differences between the material of the repaired part and the weld filler material are minimized. Furthermore, unlike simple cutting the components into layers and using such cut pieces directly for welding repair process, the controlled crushing of these components to a granulate followed by extruding of regularly shaped welding rods eliminates the cutting step which is quite dangerous for operators.

In another aspect of the above method, the weld may be subjected to additional heat and/or ultrasound post-treatment to improve material properties.

In yet another aspect of the above method the weldable thermoplastic material is poly(dodecano-12-lactam) [also called polyamide 12 or PA12].

The present invention is also provides the use of a plastic welding technique for repairing damaged aircraft engine components made of weldable thermoplastic materials.

Further, the present invention is also provides aircraft engine components that are repaired by the method set forth above, including the various aspects thereof

BRIEF DESCRIPTION OF THE DRAWINGS

Exemplary embodiments of the invention are described with reference to the following drawings, which are provided for the purpose of illustration only, the full scope of the invention being set forth in the claims that follow.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
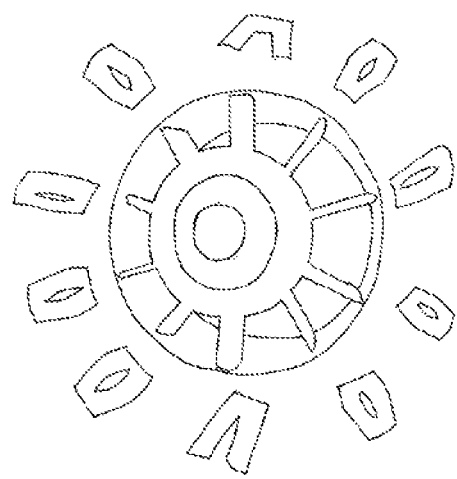
FIG. 1 is an exploded perspective view of a jet engine fan and shielding panels of thermoplastic material.
Figure 2:
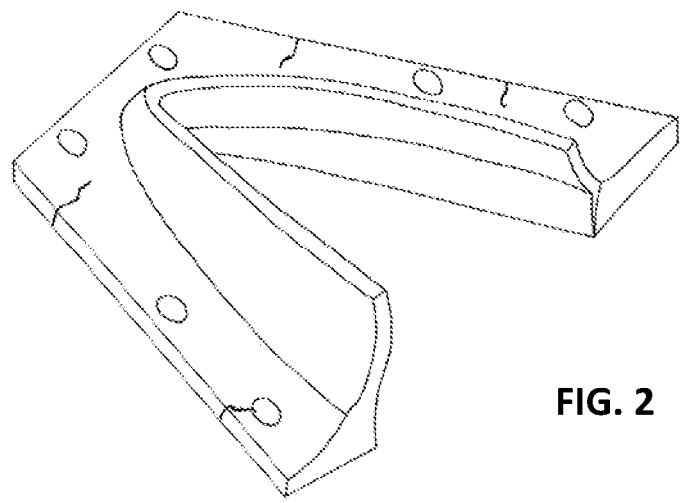
FIG. 2 is a perspective view of a single jet engine fan shielding panel provided with metallic bushings for mounting thereof onto the fan.
Figure 3:
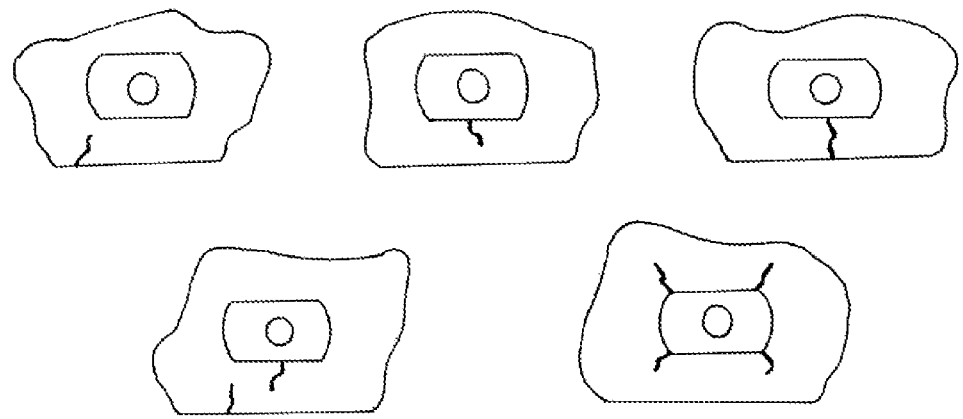
FIG. 3 shows different types of most typical damages/cracks occurring in thermoplastic shielding panels close to a metallic bushing.

Shielding panels of a weldable thermoplastic mounted onto a jet engine fan body as shown in FIG. 1 are exemplary plastic components that can be repaired by employing the method of the invention. In order to be mounted onto the fan body, the panels are provided with metallic bushings, usually made of aluminum alloys. These bushings, shown in FIG. 2, provide through openings for receiving connecting elements such as bolts or screws and at the same time protect the thermoplastic material of the panel adjacent to the opening from damage, thereby securing the panels in predetermined location. Irrespectively of these advantages, the area of panels adjacent to each such bushing is specifically exposed to stresses during operation and thus majority of typical damages such as shown in FIG. 3 occur in the direct vicinity of the bushings.

EXAMPLE 1

Repair of a Shielding Panel of Jet Engine Fan

Figure 5:
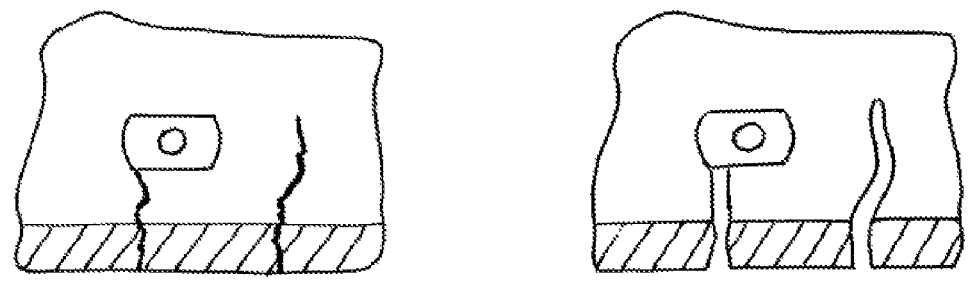
FIG. 5 shows the images of a damaged section of a thermoplastic shield bearing a metallic bushing after sequential steps of the method according to the invention.
Figure 5:
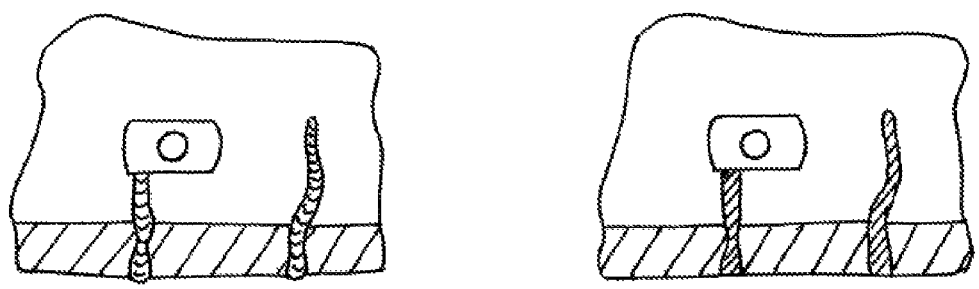

The repaired aircraft engine thermoplastic component was a shielding panel of a jet engine fan. Each such engine fan bears 5-15 such panels mounted around its circumference (see FIG. 1). The tested panel was made of PA12—composite and involved 6 bushings of aluminum alloy (see FIG. 2). After disconnection from the engine fan the panel was cleaned using isopropyl alcohol. Alternatively, other cleaning methods known for use with dirty panels can be applied such as using e.g. Ardrox®6077 (a blend of a solvent and detergent in an aqueous base). Once cleaned the panel was visually inspected for determination of the actual scope of damages to be repaired. FIG. 5, left top drawing, shows the damaged section of thermoplastic shield panel with a crack extending along the bushing after cleaning step.

Subsequently, the damaged panel area was prepared for welding by notching of the crack using a hand held tool. The notching was performed until the predetermined notch shape was obtained, the shape generally corresponding to the size of the welding rod to be used in subsequent step. FIG. 5, right top drawing, shows the damaged section prepared for welding (by notching the crack to a predetermined shape).

Figure 4:
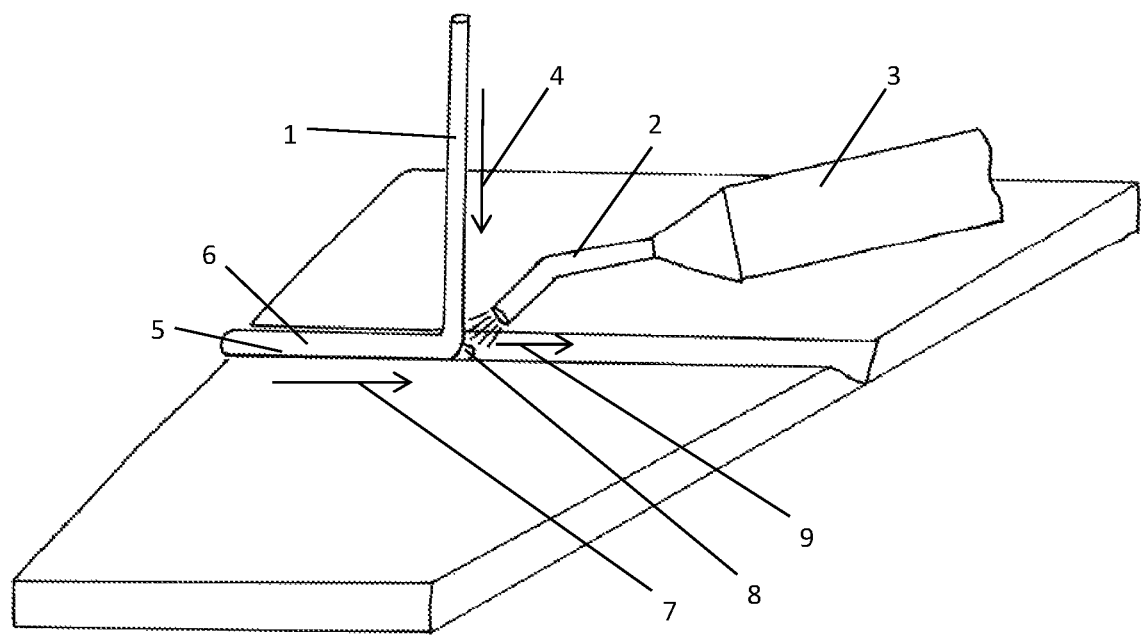
FIG. 4 illustrates the welding step of the method according to the invention.

After notching the crack, the welding step is performed using a previously prepared welding rod 1 made of the same thermoplastic material as the repaired panel. The welding process is shown in FIG. 4. The welding rod 1 was brought into close proximity of one end of the notch and hot air was blown from a nozzle 2 of a hot air torch 3. At the same time pressure 4 was applied to the rod 1 to force the melted rod material into the notch. The temperature of hot air leaving the nozzle 2 was within the range of 150-300° C., so as to soften the thermoplastic material of the welding rod 1 and edges 5 of the notch above the melting point to allow the fusion 6 of the rod material and the panel material within the notch area. The process of gradual melting and pressing the welting rod 1 into the notch proceeds in the filling direction 7. The hot air leaving the nozzle 2 heats up the rod 1 so that the melted material of the latter forms a bow wave 8 directly filling the notch. Air stream bounced from the bow wave 8 follows along the notch in the air motion direction 9 (essentially the same as the filling direction) so that the notch walls and bottom are preliminarily heated even before the rod material reaches the respective notch section. FIG. 5, left bottom drawing, shows the damaged section after the welding step.

Once the welding step was completed the weld was allowed to cool down to solidify completely. After cooling down the original geometry of the panel was restored by first mechanical removal of excessive weld material by means of a hand held tool, and then the weld area was polished by means of a hand held tool. The repaired panel section after removal of the excessive weld material is shown in FIG. 5, right bottom drawing. (The repaired section after the final step of polishing is not shown in FIG. 5.)

EXAMPLE 2

Preparation of Welding Rod

Original shielding panels of a jet engine fan were cleaned using isopropyl alcohol and comminuted in a shredder tool with rotating knives until a granulate of particle size ranging from about 1 mm to about 10 mm was obtained. Resulting granulate was heated, melted and fed into a screw extruder by whole heat section to a specially shaped nozzle giving the regular welding rods a predetermined circular cross-section having a diameter ranging from about 1 mm to about 5 mm. The welding rod leaving the extruder nozzle is cooled in a water tank and after drying is stored for future use in the repair method according to the present invention.

EXAMPLE 3

Testing of Mechanical Strength of Repaired Component(s)

A 3-point bending test was performed to compare the mechanical properties of repaired and non-repaired thermoplastic material. Accordingly, samples of base material without repair, conventionally repaired (glued) samples and samples repaired by the described welding technique were prepared and assessed. Setting the base material results as 100% the conventionally repaired samples reach a bending strength of 25-50% and a strain of only 30%. The samples repaired with the welding method according to the present invention achieve a bending strength of 80-90% and a strain level of 100% compared to the base material.

What is claimed is:

1. A method of repairing a damaged area of an aircraft engine component made of or comprising weldable thermoplastic material or thermoplastic-elastomer composite, wherein the method comprises:
   cleaning the damaged area of the component;
   preparing the damaged area for welding by notching of a crack or other type of damage to a predetermined shape of a notch;
   providing weld filler material;
   heating a contact area of weld filler material and the notch and at the same time applying pressure to the weld filler material to introduce softened weld filler material into the notch and fuse the weld filler material with material of walls of the notch;
   allowing a resultant weld to cool down,
the weld filler material being obtained from one or more original aircraft engine components of weldable thermoplastic material by crushing of one or more initially prepared components to a granulate of predetermined granule size, melting a resultant granulate and extruding the weld filler material to form regularly shaped rods for use in the repair method.

2. The method of claim 1, wherein welding comprises using a hot air nozzle as a heat source.

3. The method of claim 1, wherein an initial preparation of the components to be crushed comprises removal of all metallic elements, and cleaning the components.

4. The method of claim 1, wherein the weld is subjected to additional heat and/or ultrasound post-treatment to improve material properties.

5. The method of claim 1, wherein the weldable thermoplastic material comprises poly(dodecano-12-lactam).

6. A method of making a weldable thermoplastic material for repairing a damaged area of an aircraft engine component made of or comprising weldable thermoplastic material, wherein the method comprises making weld filler material from one or more original aircraft engine components of weldable thermoplastic material by crushing of one or more initially prepared components to a granulate of predetermined granule size, melting a resultant granulate and extruding the weld filler material to form regularly shaped rods for use in repairing the damaged area of an aircraft engine component.

7. The method of claim 6, wherein the weldable thermoplastic material comprises poly(dodecano-12-lactam).

8. The method of claim 1, wherein the aircraft engine component is a shielding panel surrounding a jet engine fan.

9. The method of claim 1, wherein the predetermined shape of the notch corresponds to a shape of a rod of filler material.

10. The method of claim 1, wherein the predetermined granule size is from 1 mm to 10 mm.

11. The method of claim 1, wherein the rods have a circular cross-section with a diameter ranging from about 1 mm to about 5 mm.

12. The method of claim 9, wherein the rods have a circular cross-section with a diameter ranging from about 1 mm to about 5 mm.

13. The method of claim 6, wherein the predetermined granule size is from 1 mm to 10 mm.

14. The method of claim 6, wherein the rods have a circular cross-section with a diameter ranging from about 1 mm to about 5 mm.

* * * * *